United States Patent [19]

Hoefnagels

[11] 4,198,665
[45] Apr. 15, 1980

[54] PIVOTABLE CASSETTE HOLDER FOR A MAGNETIC TAPE RECORDER APPARATUS

[75] Inventor: Johannes F. Hoefnagels, Eindhoven, Netherlands

[73] Assignee: U.S. Philips Corporation, New York, N.Y.

[21] Appl. No.: 962,437

[22] Filed: Nov. 20, 1978

[30] Foreign Application Priority Data

Nov. 30, 1977 [NL] Netherlands .................. 77 13194

[51] Int. Cl.² ........................................... G11B 15/60
[52] U.S. Cl. .................................................. 360/96.6
[58] Field of Search ............................. 360/96.5, 96.6

[56] References Cited

U.S. PATENT DOCUMENTS

| | | | |
|---|---|---|---|
| 3,766,327 | 10/1973 | Johnson et al. | 360/96.6 |
| 3,947,884 | 3/1976 | Yokota et al. | 360/96.6 |
| 4,069,506 | 1/1978 | Veno | 360/96.5 |

Primary Examiner—Robert S. Tupper
Attorney, Agent, or Firm—David R. Treacy

[57] ABSTRACT

A cassette holder for Compact Cassettes, which is pivotable about a pivoting axis and intended for a vertical cassette recorder, is provided with stop means in order to avoid an incorrect position of the cassette, the openings in the front of the cassette, for the passage of the magnetic heads and the pressure roller, not being oriented towards the pivoting axis of the cassette holder but towards the insertion opening. In the cassette holder guide ridges are provided which co-operate with the cassette near its side walls and beside the locally thickened portion in the cassette, in such a way that during insertion the cassette is tilted from an oblique position to a straighter position, the top edge of the cassette holder butting against the locally thickened portion of the cassette in the case of an incorrectly inserted cassette.

4 Claims, 6 Drawing Figures

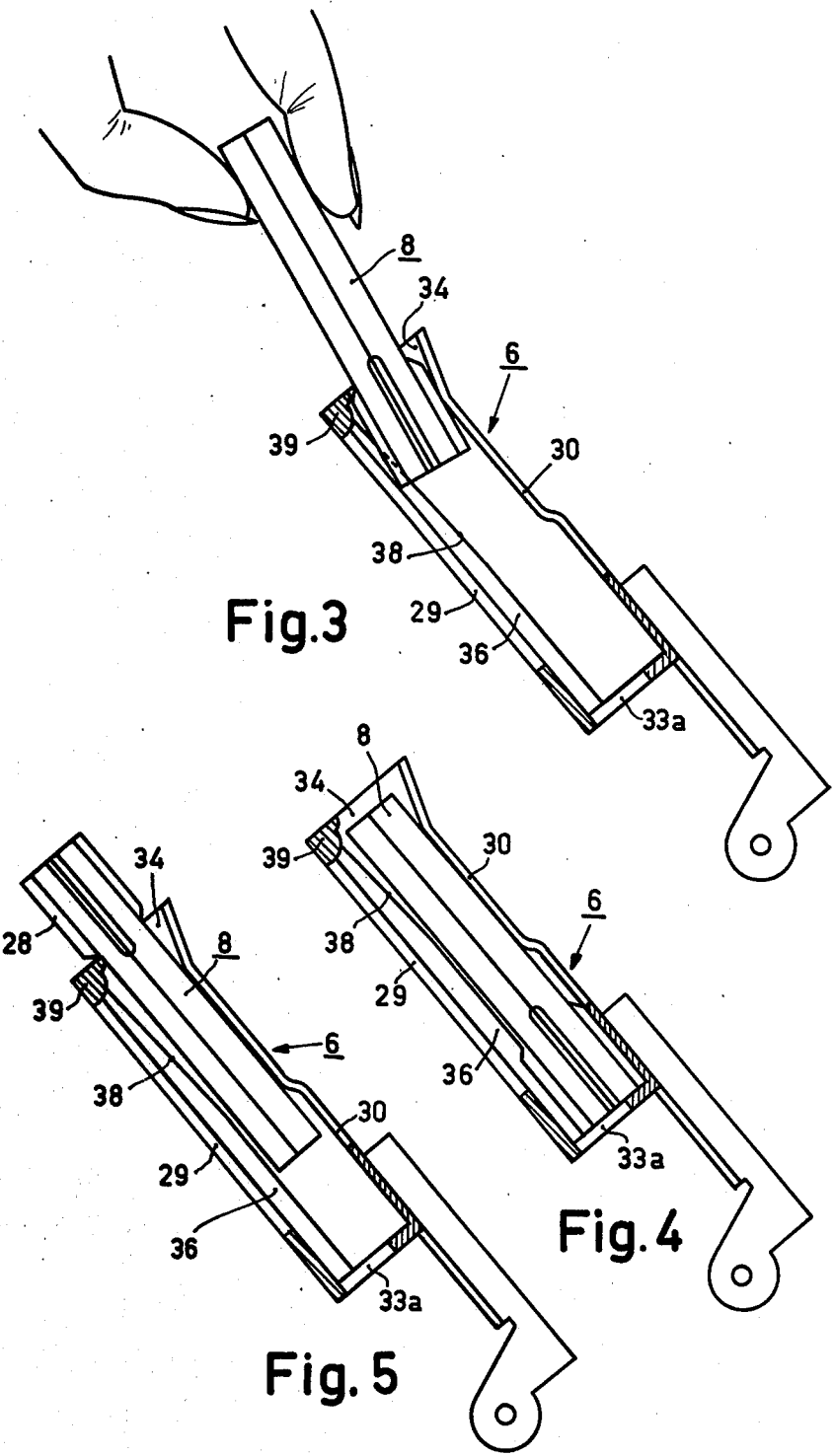

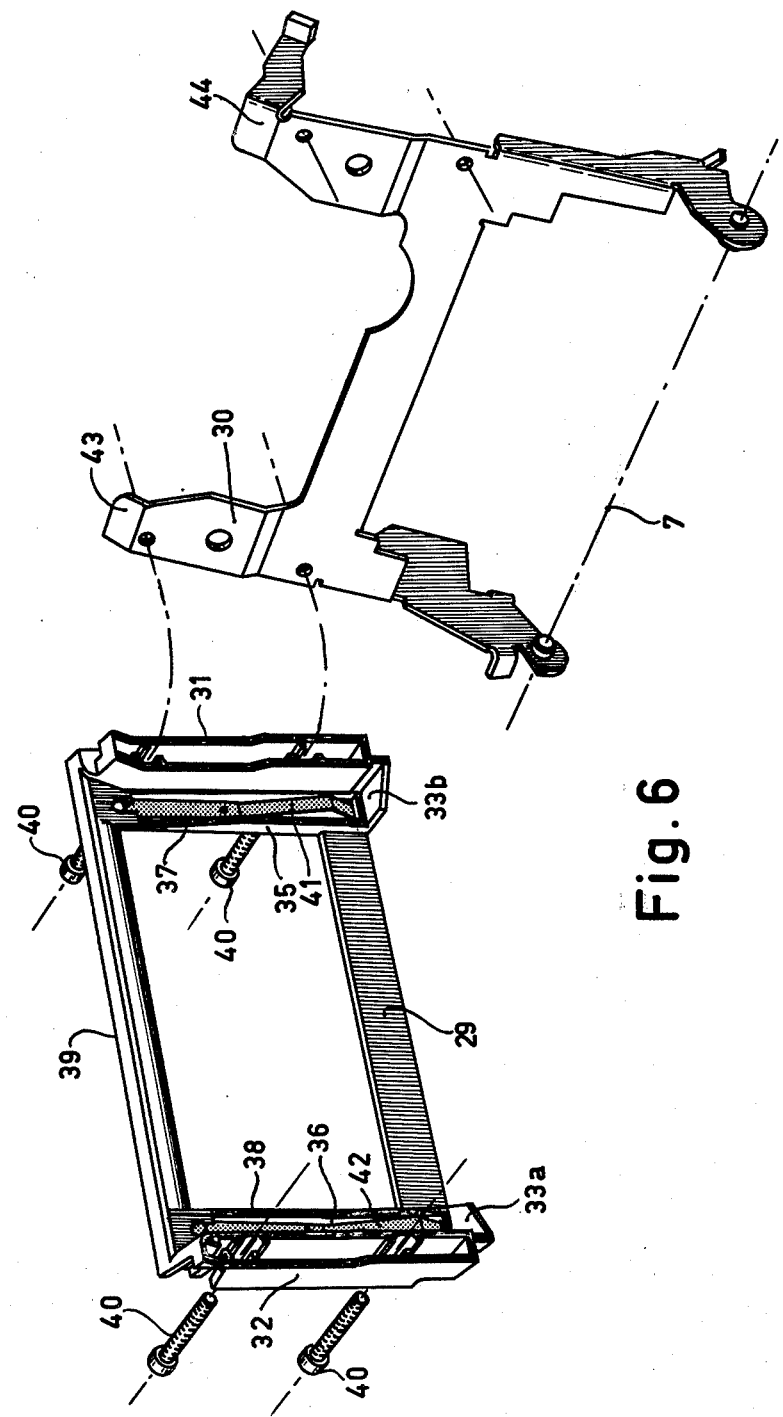

PIVOTABLE CASSETTE HOLDER FOR A MAGNETIC TAPE RECORDER APPARATUS

BACKGROUND OF THE INVENTION

1. Field of the Invention

The invention relates to a cassette holder for a magnetic-tape recording/playback apparatus, and more particularly to a holder which is pivotable about a pivoting axis and is adapted to receive cassettes which are provided with two coplanar adjoining magnetic-tape reels which are rotatable about parallel axes of rotation and are situated in a cassette housing. Such a housing has two major walls on both sides of the reels, interconnected by two closed side walls, a substantially closed rear wall and by a front wall with openings for the passage of components of a recording/playback apparatus, such as a magnetic recording/playback head, an erase head, and a pressure roller etc. The side walls are provided with projection portions in the form of ridges, which extend along a part of the side wall and parallel to the major walls and are situated near the front wall at half the height of the side wall, so that locally the cassette has a greater width, and furthermore each of the major walls has a projecting portion in the form of a raised portion which extends over the openings in the front wall, so that locally the cassette has a greater thickness.

The cassette holder itself a first wall which is parallel to the major walls of an inserted cassette and an axial second wall which is parallel thereto; two side walls; a bottom wall which faces the pivoting axis and an open at least substantially top side which is remote from the pivoting axis, whose opening serves as a cassette insertion opening for the insertion of a cassette into the cassette holder; stop means which cooperate with projecting portions of the cassette housing when a cassette is inserted into the cassette holder, so as to avoid an incorrect position of the cassette in the cassette holder, a position in which the substantially closed rear wall of the cassette would be oriented towards the bottom wall of the cassette holder; and guide means for the major walls of the cassette housing near its side walls and beside its locally thickened portion during insertion of a cassette, having two guide ridges which extend in the longitudinal direction of and near the side walls of the cassette holder.

In the present stage of development of magnetic tape recording/playback apparatus adapted for use in conjunction with the well-known Compact Cassettes, the so-called cassette recorders, a distinction can be made between two main categories of cassette recorders. One category is cassette recorders with a horizontal cassette holder (the so-called horizontal cassette recorders), and the other category is recorders having a vertical cassette holder (the so-called vertical cassette recorders). Of these two categories the former was the first to appear on the market. In such equipment of this category the cassette holder is pivotable about an axis which is disposed near the rear wall of a cassette contained in the cassette holer. This permits convenient use of the cassette recorder, because in this way a user can insert a cassette into the cassette holder with a smooth movement. Moreover, the components of the cassette recorder which cooperate with the magnetic tape in the cassette, such as the magnetic heads and the pressure roller, are located at the front of the cassette recorder facing the user. These components can be controlled by means of the controls, such as push-buttons, which are situated at this location. In horizontal cassette recorders the front side of an inserted cassette, in which the openings are formed, is consequently always located at the open topside of the cassette holder. Thus, incorrect insertion of a cassette can be prevented simply. Both the locally widened portion and the locally thickened portion of the cassette are situated at the side which is located nearer the open front side of the cassette. Thus, stop means may be incorporated in the cassette holder which permit the insertion of the thinner and narrower part of the cassette over the full length of the cassette holder, but which enable the insertion of the wider and thicker part of the cassette over a part of the length only. Compact Cassettes are labelled in such a way that the cassette, when in the operating position in a horizontal cassette recorder, is correctly positioned to enable it to be read by a user.

In vertical cassette recorders the pivoting axis of the cassette holder is generally situated at the side which faces the bottom of the apparatus, where the components of the apparatus which co-operate with the magnetic tape in the cassette and the controls are also located. However, in this equipment the cassette should be inserted with its thickened and widened portion foremost. Thus, in comparison with a horizontal cassette recorder the position of a cassette relative to the pivoting axis of the cassette holder is exactly the other way round. This complicates prevention of incorrect insertion of the cassette into the cassette holder.

2. Description of the Prior Art

In a known vertical cassette recorder moving components are mounted in the cassette holder, which components engage the raised portion of the major wall of the cassette, sense said raised portion, and then actuate moving stop means in such a way that the cassette can be fully inserted into the cassette holder only if the raised portion has passed first. The raised portion causes a tilting plate to tilt, which plate is pivotable to a limited extent about an axis parallel to the pivoting axis of the cassette holder and is journalled on the cassette holder. A stop pin, which is pushed away by the front of the cassette. If the cassette is incorrectly inserted into the cassette, is mounted on a resiliently pivotable lever holder, the tilting plate is not tilted and the stop pin is retained by the tilting plate. Thus, as described in U.S. Pat. No. 3,764,089 the cassette cannot be inserted any further and is ejected by the resiliently pivotable lever.

SUMMARY OF THE INVENTION

It is the object of the invention to provide a cassette holder of the type described above, which has the advantage that no moving parts are required to prevent incorrect insertion of the cassette.

According to the invention, the guide ridges, nearer the insertion opening, have a guide profile which at least partly varies in height and which allows the cassette to be inserted obliquely, relative to the first and second walls of the cassette holder, but during further insertion of the cassette forces it into a position which is more parallel to the said walls; and the stop means comprise a part of one of the first and second walls of the cassette holder, which part is situated near the insertion opening of the cassette holder, for engaging the locally raised portion in the nearby major wall of an incorrectly inserted cassette, after the cassette has been forced into its more parallel position by the guide ridges. Thus, the invention provides a cassette holder which without the use of moving parts effectively prevents incorrect insertion of a cassette. The locally thickened portion of the cassette is only 1.7 mm for each major wall of the cassette. However, this is found to be amply satisfactory for the object pursued.

BRIEF DESCRIPTION OF THE DRAWINGS

The invention will now be described in more detail with reference to the drawing, in which:

FIG. 3 is a schematic cross-section of the cassette holder of the cassette recorder of FIG. 1, a Compact Cassette being inserted correctly, FIG. 4 is a similar cross-section as in FIG. 3, but now with a fully inserted cassette, FIG. 5 is a similar cross-section as in FIGS. 3 and 4, with an incorrectly inserted cassette, and FIG. 6 is an exploded view of the parts of the cassette holder of the cassette recorder of FIG. 1, which are relevant for the invention.

DESCRIPTION OF THE PREFERRED EMBODIMENT

Figure 1:
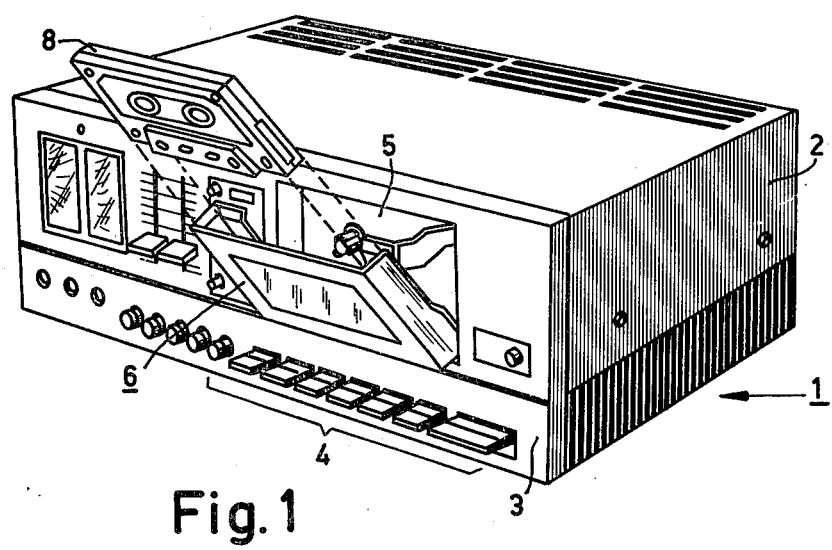
FIG. 1 shows a vertical cassette recorder having a cassette holder in accordance with the invention.

The cassette recorder 1 of FIG. 1 comprises a housing 2 with a front panel 3. On the front panel there are located a plurality of push-buttons 4 for a cassette recorder mechanism, not shown, which is not part of the invention. The housing has a recess 5, in which a cassette holder 6 is mounted to be pivotable about a pivoting axis 7 (see FIG. 6).

Figure 2:
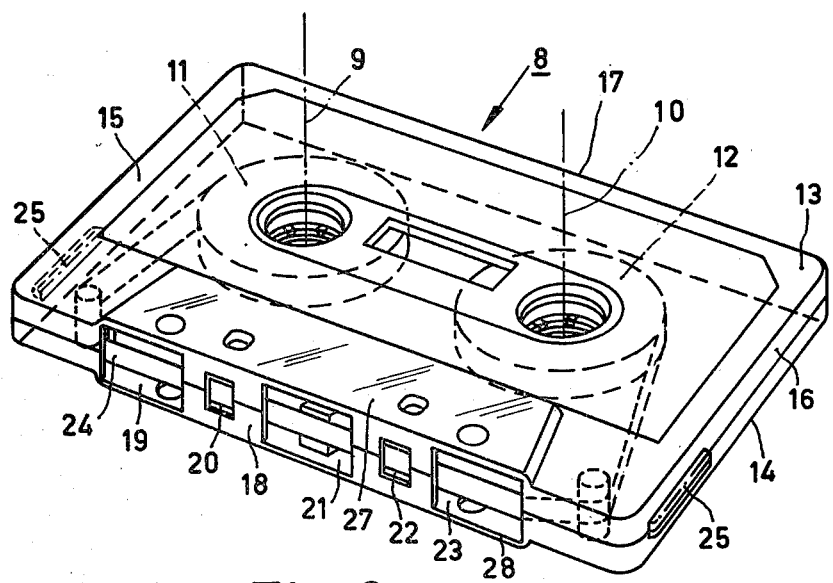
FIG. 2 shows a Compact Cassette.

The cassette recorder 1 is adapted to co-operate with Compact Cassettes, see FIG. 2. The cassette 8 is provided with two co-planar adjoining reels 11 and 12 which are rotatable about parallel axes of rotation 9 and 10. These reels are accommodated in a cassette housing comprising two major walls 13 and 14 on both sides of the reels and interconnected by two closed side walls 15 and 16, a substantially closed rear wall 17 and by a front wall 18 with openings 19 through 23 for the passage of cassette recorder components, such as a magnetic recording/playback head, an erase head, or a pressure roller. These components are adapted to cooperate with the magnetic tape 24 contained in the cassette housing. The side walls are provided with projecting portions in the form of ridges 25 and 26, which extend along a part of the side wall and parallel to the major walls 14 and 13 and are situated near the front wall 18 and at half the height of the side walls, so that the cassette locally has a greater width. Furthermore, each of the major walls 13 and 14 is provided with a projecting portion in the form of a raised portion 27 and 28, which extend over the openings 19 through 23 in the front wall 18, so that locally the cassette has a greater thickness. In these raised portion openings, not designated by reference numerals, are formed for the passage of a capstan and locating pins.

The cassette holder, also shown in FIGS. 3 through 6, has a first wall 29 which is parallel to the major walls 13 and 14 of the cassette contained in the cassette holder and, parallel to the first wall and facing it, a second wall 30, as well as two side walls 31 and 32, a bottom wall 33 which faces the pivoting axis 7 (see FIG. 6), and a substantially open top side which is remote from the pivoting axis 7, whose opening 34 serves as cassette insertion opening for insertion of a cassette into the cassette holder. The bottom 33 is also substantially open, the closed parts serve for retaining the cassette in its lowermost position. These closed parts are designated 33a and 33b. The wall 30 is also open for the greater part, because the cassette should obviously be capable of cooperating with the drive means of the cassette recorder when the cassette holder is closed.

Upon insertion of the cassette 8 into the cassette holder 6 the cassette, if it has been inserted into the cassette holder in an incorrect position, stop means of the cassette holder. The correct position of the cassette relative to the cassette holder is shown in FIG. 1. The front wall 18 of the cassette should face the lower wall 33 of the cassette holder, because in the cassette recorder 1 the magnetic heads and the pressure roller are located at the side of the push-buttons 4. In order to avoid an incorrect position of the cassette in the cassette holder the holder includes guide means which, during insertion of a cassette, engage the major walls 13 and 14 of the cassette housing near its side walls 15 and 16 and beside the locally thickened portion owing to the projecting portions 27 and 28. These guide means consist of two guide ridges 35 and 36 which extend in the longitudinal direction of and near the side walls 31 and 32 of the cassette holder 6. Nearer the insertion opening 34 these ridges have a sloping guide profile 37 and 38, which allows the cassette to be inserted obliquely relative to the walls 20 and 30 of the cassette holder, but during further insertion of the cassette forces the cassette into a position which is more parallel to the said walls. The stop means are formed by a portion 39 of the first wall 29, which portion is situated near the insertion opening 34 of the cassette holder 6, and which, when the cassette is inserted into the cassette holder in an incorrect position, engages the locally raised portion 28 of the cassette, after the cassette has been forced into its position which is more parallel to the walls 29 and 30 by the guide means 35 and 36.

The situation when the cassette is correctly inserted and when the cassette is incorrectly inserted will be evident from FIGS. 3, 4 and 5 respectively.

The construction of the cassette holder parts is shown in FIG. 6. The second wall 30 is formed by a part which is bent from metal sheet. The first wall 29, which is injection-moulded from a plastic is secured with the aid of four bolts 40. In the wall 29 two leaf-springs 41 and 42 are fixed, which do not form part of the invention and which serve to press a cassette resiliently against the bottom of the recess 5 of the cassette recorder when the cassette holder is closed. In order to facilitate oblique insertion of the cassette, the wall 30 is provided with obliquely extending parts 43 and 44 (see FIG. 3) and the stop portion 39 of the wall 29 has rounded internal shoulders, (FIGS. 3 through 5).

What is claimed is:

1. A cassette holder for a magnetic tape recording/playback apparatus, said holder being pivotably mounted to the apparatus for motion about a pivoting axis, the holder being adapted to receive a cassette having two major walls and two coplanar adjoining magnetic tape reels rotatable about parallel axes of rotation, said axes of rotation being perpendicular to said walls; the cassette further including two closed side walls, a substantially closed rear wall, and a front wall, interconnecting said major walls, said front wall having openings for the passage of components of a recording/playback apparatus, the components including a magnetic recording/playback head, an erase head, and a pressure roller; the cassette side walls having each having a projecting ridge extending along a part of the respective side wall parallel to the major walls, disposed near the front wall at half the height of the side wall, whereby at the location of the ridges the cassette has an increased width; and each of the cassette major walls having a raised portion extending over the openings in the front wall, projecting outwardly from the major wall so that locally the cassette has an increased thickness, said cassette holder comprising a first wall parallel to the major walls of an inserted cassette, a second wall parallel to said first wall, two side walls, a bottom wall facing the pivoting axis, and an at least substantially open top side remote from the pivoting axis, the opening of the top side being adapted for insertion of a cassette into the cassette holder; stop means which engage the raised portions of the housing during insertion of an incorrectly positioned cassette into the holder, an incorrectly positioned cassette being one in which the substantially closed rear wall is oriented toward the bottom wall of the cassette holder; and guide means for cooperation with the cassette major walls near the cassette side walls and beside the cassette raised portion of locally greater thickness, said guide means comprising two guide ridges extending in the longitudinal insertion direction of, and near the side walls of, the cassette holder, comprising the improvement wherein said guide ridges have a guide profile, nearer the insertion opening, which varies in height so as to allow a cassette to be inserted obliquely relative to the first and second walls of the cassette holder but during further insertion of a cassette forces the cassette into a position substantially parallel to said first and second walls, and said stop means comprise a part of one of said first and second walls of the cassette holder, said part being situated near the insertion opening of the cassette holder for engagement with the locally thicker raised portion of an incorrectly inserted cassette, after the cassette has been inserted sufficiently so as to be forced into said substantially parallel position by the guide ridges, whereby further insertion of an incorrectly positioned cassette is prevented.

2. A cassette holder, having improved means for preventing insertion of an incorrectly positioned cassette having two major walls each extending between a front and a rear and between two sides of the cassette, the cassette further including means interconnecting said walls, each of the major walls having a raised portion adjacent the front of the cassette and spaced from each of the sides of the cassette, the cassette locally having a greater thickness over said raised portions, the holder comprising a first wall and a second wall extending parallel to each other and to the major walls of an inserted cassette, said first and second walls extending between a bottom of the holder and an open top of the holder, said open top being a cassette insertion opening for insertion of a cassette into the holder; guide means extending in a longitudinal direction of the holder between the top and bottom for engaging the major walls of a cassette being inserted; and stop means for engaging the raised portions of a cassette which has been incorrectly inserted with the cassette rear oriented toward the holder bottom, whereby complete insertion of an incorrectly positioned cassette is prevented, wherein said guide means comprise a ridge projecting inwardly from one of said first and second walls of the holder and disposed to engage a major wall of an inserted cassette along a path adjacent a side of the cassette to one side of the raised portion, near the insertion opening the ridge having a profile varying in height so as to allow insertion of a cassette obliquely relative to the first and second holder walls but during further insertion of the cassette forcing the cassette into a position substantially parallel to said holder walls; and the stop means comprises a part projecting inwardly from said one of said first and second walls adjacent to the insertion opening of the holder, arranged to permit initial oblique insertion of a correctly positioned cassette, but to engage the locally raised portion of the major wall of an incorrectly positioned cassette which has been inserted so far as to be forced into said substantially parallel position by said guide ridge, thereby preventing further insertion of the incorrectly positioned cassette.

3. A holder as claimed in claim 2 wherein said guide means includes two said guide ridges arranged symmetrically for engaging a major wall of the said adjacent the respective sides of the cassette, said ridges having a given height with respect to said one wall adjacent the bottom of the holder, near the holder opening said ridges tapering obliquely toward said one wall, the other one of said first and second walls having a portion opposite the stop part arranged obliquely outward for guiding an obliquely positioned cassette during initial insertion.

4. A holder as claimed in claim 3 comprising first and second members, said one wall, ridges and stop part being portions of one member, said second wall being formed by said second member, and the holder bottom having an opening for passage of a component of a recording/playback apparatus therethrough to cooperate with the front of a properly inserted cassette.

* * * * *